US010586526B2

(12) United States Patent
Hua

(10) Patent No.: US 10,586,526 B2
(45) Date of Patent: Mar. 10, 2020

(54) SPEECH ANALYSIS AND SYNTHESIS METHOD BASED ON HARMONIC MODEL AND SOURCE-VOCAL TRACT DECOMPOSITION

(71) Applicant: Kanru Hua, Shanghai (CN)

(72) Inventor: Kanru Hua, Shanghai (CN)

(*) Notice: Subject to any disclaimer, the term of this patent is extended or adjusted under 35 U.S.C. 154(b) by 0 days.

(21) Appl. No.: 15/745,307

(22) PCT Filed: Dec. 10, 2015

(86) PCT No.: PCT/IB2015/059495
§ 371 (c)(1),
(2) Date: Jan. 16, 2018

(87) PCT Pub. No.: WO2017/098307
PCT Pub. Date: Jun. 15, 2017

(65) Prior Publication Data
US 2019/0013005 A1 Jan. 10, 2019

(51) Int. Cl.

| | |
|---|---|
| ***G10L 13/02*** | (2013.01) |
| ***G10L 25/90*** | (2013.01) |
| ***G10L 13/04*** | (2013.01) |
| ***G10L 25/18*** | (2013.01) |
| ***G10L 15/02*** | (2006.01) |
| ***G10L 25/48*** | (2013.01) |
| ***G10L 25/45*** | (2013.01) |
| ***G10L 25/75*** | (2013.01) |

(52) U.S. Cl.
CPC .............. *G10L 13/04* (2013.01); *G10L 13/02* (2013.01); *G10L 25/45* (2013.01); *G10L 25/48* (2013.01); *G10L 25/75* (2013.01)

(58) Field of Classification Search
CPC .......... G10L 19/02; G10L 13/04; G10L 13/02
See application file for complete search history.

(56) References Cited

U.S. PATENT DOCUMENTS

| | | | | |
|---|---|---|---|---|
| 5,023,910 | A * | 6/1991 | Thomson | G10L 19/02 704/206 |
| 2012/0053933 | A1 * | 3/2012 | Tamura | G10L 13/04 704/207 |
| 2013/0245486 | A1 * | 9/2013 | Simon | A61N 1/36021 600/546 |
| 2016/0005391 | A1 * | 1/2016 | Agiomyrgiannakis | G10L 13/02 704/260 |

FOREIGN PATENT DOCUMENTS

| | | |
|---|---|---|
| CN | 1669074 | 9/2005 |
| CN | 101981612 | 2/2011 |
| CN | 103544949 | 1/2014 |
| EP | 1619666 | 1/2006 |

OTHER PUBLICATIONS

International Search Report for related International Application PCT/IB2015/059495 dated Aug. 29, 2016.

* cited by examiner

*Primary Examiner* — Shreyans A Patel
(74) *Attorney, Agent, or Firm* — K&L Gates LLP

(57) ABSTRACT

This invention discloses a speech analysis/synthesis method and a simplified form of such a method. Based on a harmonic model, the present method decomposes the parameters of the harmonic model into glottal source characteristics and vocal tract characteristics in its analysis stage and recombines the glottal source and vocal tract characteristics into harmonic model parameters in its synthesis stage.

12 Claims, 4 Drawing Sheets

SPEECH ANALYSIS AND SYNTHESIS METHOD BASED ON HARMONIC MODEL AND SOURCE-VOCAL TRACT DECOMPOSITION

CROSS REFERENCE TO RELATED APPLICATIONS

The present application is a National Stage of International Application No. PCT/IB2015/059495 filed on Dec. 10, 2015.

FIELD OF THE INVENTION

This invention relates to speech synthesis. In particular, it relates to the subfields of speech analysis/synthesis and vocoding.

BACKGROUND OF THE INVENTION

Speech analysis/synthesis techniques concern with analyzing speech signals to obtain an intermediate representation, and resynthesizing speech signal from such representation. Modification of speech characteristics such as pitch, duration and voice quality can be achieved by modifying the intermediate representation obtained from the analysis.

Speech analysis/synthesis system comprises an important component in speech synthesis and audio processing applications, where a high-quality parametric speech analysis/synthesis method is often required to achieve flexible manipulation of speech parameters.

The common approaches to speech analysis/synthesis are based on the source-filter model, in which the human speech production system is modeled as a pulse train signal and a set of cascaded filters including a glottal flow filter, a vocal tract filter and a lip radiation filter. The pulse train signal is a periodic repetition of a unit impulse signal at an interval of the fundamental period.

A simplied version of the source-filter model has been widely adopted in speech analysis/synthesis techniques. Such simpliciation unifies the glottal flow filter and the lip radiation filter into part of the vocal tract filter. Speech analysis/synthesis methods based on such a simplified model include PSOLA (Pitch-Synchronous OverLap Add), STRAIGHT and MLSA (Mel Log Spectrum Approximation) filter.

When the fundamental frequency of a speech signal is modified, the simplified source-filter model reveals certain defects. The glottal flow signal is proportional to the volume-velocity of the air flow though glottis and it represents the degree of the glottis contraction. Since the fundamental frequency determines the frequency of glottal oscillation, the impulse response of the glottal flow filter should match the duration of a fundamental period and the shape of such glottal flow should remain approximately invariant at different fundamental frequencies, despite that the length of a glottal flow period changes according to the fundamental frequency. However, in the simplified source-filter model, the glottal flow filter is merged into the vocal tract filter under the assumption that the glottal flow filter response is independent from the fundamental frequency. Such assumption contradicts with the physics of speech production, and as a result, after modifying the fundamental frequency parameters, speech analysis/synthesis methods based on the simplified source-filter model often fail to generate natural-sounding speech.

Recently a number of methods have been proposed to overcome the above defects. For example, SVLN (G. Degottex, et al. "Mixed source model and its adapted vocal tract filter estimate for voice transformation and synthesis," *Speech Communication*, vol. 55, no. 2, pp. 278294, 2013.) and GSS (J. P. Cabral, K. Richmond, J. Yamagishi, and S. Renals, "Glottal Spectral Separation for Speech Synthesis," *IEEE Journal of Selected Topics in Signal Processing*, vol. 8, no. 2, pp. 195208, 2014.) In these methods glottal flow and vocal tract are separately modeled. Since the characteristics of the lip radiation filter is similar to a differentiator, the lip radiation filter is merged into the glottal flow filter, resulting in a glottal flow derivative filter. The glottal flow derivative is parameterized by a LF (Lijencrants-Fant) model. During the analysis stage, the parameters for the glottal source model are first estimated; next, the magnitude spectrum of speech is divided by the magnitude response derived from the glottal source model, after which spectral envelope estimation is performed, yielding the vocal tract magnitude response. Based on the minimum-phase assumption, the vocal tract frequency response can be computed from the vocal tract magnitude response. The synthesis stage is equivalent to the reverse of the analysis procedures and is not described here.

To a certain extent SVLN and GSS methods improve the quality of pitch-shifted speech, but there still exist several issues causing quality degradation. First, the quality of synthesized speech is affected by the accuracy of parameter estimation for the glottal model. In the case when the estimated glottal parameters deviate from the truth or are subjected to spurious fluctuations along time, the resynthesized speech could contain glitches or sound different from the original speech signal. Another issue with methods based on a parametric glottal model is the limited expressivity of the glottal model, that some certain types of glottal flow patterns may not be covered by the parameter space. In such a situation, an approximated glottal flow pattern is used instead, which eventually leads to poorly reconstructed speech.

A recently proposed speech analysis/synthesis method, HMPD (G. Degottex and D. Erro, A uniform phase representation for the harmonic model in speech synthesis applications, EURASIP Journal on Audio, Speech, and Music Processing, vol. 2014, no. 1, 2014.) does not require a procedure for glottal source model parameter estimation and is thus more robust to a certain extent. Based on harmonic model, the analysis stage of HMPD first estimates the vocal tract phase response; next, the vocal tract component is subtracted from the vector of harmonic phases and the glottal source phase response at each harmonic is obtained. Finally, phase distortion of the glottal source, a feature similar to group delay function is computed. When performing pitch modification, the phase distortion is first unwrapped and then interpolated according to the new fundamental frequency. A problem with such an approach is that the phase unwrapping operation is prone to errors, especially on high-pitched speech where the operation is likely to generate speech parameter sequences that are discontinuous across frames. In addition, such approach assumes that the glottal source has a uniform magnitude response and as a result, the method does not model the influence of fundamental frequency on the magnitude response of the glottal flow filter.

Based on a harmonic model, the present invention decomposes the harmonic model parameters into glottal source and vocal tract components. Utilizing the shape-invariant propertiy of glottal flow signals, by preserving the difference between the phases of the glottal soruce harmonics and the phases generated from a glottal flow model, the present invention effectively reduces the impact of glottal flow parameter estimation accuracy on the quality of synthesized speech. A simplified variant of the present method implicitly models the glottal source characteristics without depending on any specific parametric glottal flow model and thus simplifies the speech analysis/synthesis procedures. The method and its variant disclosed in the present invention do not involve phase unwrapping operation, therefore avoiding the problem of discontinuous speech parameters. In the case when the speech parameters are unmodified, the method and its variant disclosed in the present invention do not introduce harmonic amplitude or phase distortion, guaranteeing perfect reconstruction of harmonic model parameters.

SUMMARY OF THE INVENTION

This patent discloses a speech analysis/synthesis method and a simplified form of the method. In the analysis stage of the disclosed method, the parameters of a harmonic model are decomposed into vocal tract and glottal source components; in the synthesis stage, the parameters of a harmonic model are reconstructed from the vocal tract and glottal source components.

According to the basic form of the speech analysis/synthesis method disclosed in the present invention, the analysis stage comprises the following procedures.

Step 1. Estimate fundamental frequency and harmonic model parameters from the input speech signal. The fundamental frequency, amplitude and phase vectors of the harmonics at each analysis instant are obtained. Compute the relative phase shift from the harmonic phase vector.

Step 2. Estimate the glottal source characteristics from the input speech at each analysis instant, obtaining the parameters of a glottal flow model. Compute the glottal source frequency response from the parameters of the glottal flow model, including the magnitude response and the phase response of the glottal flow model.

Step 3. Divide the harmonic amplitude vector by the model-derived glottal flow magnitude response and the lip radiation magnitude response. The vocal tract magnitude response is obtained.

Step 4. Compute the vocal tract phase response from the vocal tract magnitude response.

Step 5. Compute the glottal source frequency response, including the magnitude and phase vectors of the glottal source corresponding to the harmonics.

Step 6. Compute the difference between the phase vector of the glottal source harmonics obtained in step 5 and the model-derived glottal flow phase response obtained in step 2. The harmonic phase difference vector is obtained.

According to the basic form of the speech analysis/synthesis method disclosed in the present invention, the synthesis stage comprises the following procedures.

Step 1. Compute the vocal tract phase response from the vocal tract magnitude response.

Step 2. According to the glottal flow model parameters and the fundamental frequency, compute the frequency response of the glottal flow model, including the magnitude response and the phase response of the glottal flow model.

Step 3. Compute the sum of the model-derived glottal flow phase response and the harmonic phase difference vector. The phase vector of the glottal source harmonics is obtained.

Step 4. Multiply the amplitude vector of glottal source harmonics by the vocal tract magnitude response, obtaining the amplitude vector of speech harmonics. Compute the sum of the phase vector of glottal source harmonics and the vocal tract phase response, obtaining the phase vector of speech harmonics.

Step 5. Generate speech signal from the fundamental frequency and the amplitude and phase vectors of speech harmonics.

According to the simplified form of the speech analysis/synthesis method disclosed in the present invention, the analysis stage comprises the following procedures.

Step 1. Estimate fundamental frequency and harmonic model parameters from the input speech signal. The fundamental frequency, amplitude and phase vectors of the harmonics at each analysis instant are obtained. Compute the relative phase shift from the harmonic phase vector.

Step 2. Optionally, estimate the glottal source characteristics of the input signal at each analysis instant and compute the glottal source magnitude response.

Step 3. Compute the vocal tract magnitude response from the harmonic amplitude vector and the optional glottal source magnitude response.

Step 4. Compute the vocal tract phase response from the vocal tract magnitude response.

Step 5. Compute the glottal source frequency response, including the magnitude and phase vectors of the glottal source corresponding to the harmonics.

According to the simplified form of the speech analysis/synthesis method disclosed in the present invention, the synthesis stage comprises the following procedures.

Step 1. Compute the vocal tract phase response from the vocal tract magnitude response.

Step 2. Multiply the amplitude vector of glottal source harmonics by the vocal tract magnitude response, obtaining the amplitude vector of speech harmonics. Compute the sum of the vocal tract phase response and the phase vector of glottal source harmonics, obtaining the phase of each harmonic.

Step 3. Generate speech signal from the fundamental frequency and the amplitude and phase of each harmonic.

DETAILED DESCRIPTION OF THE INVENTION

Figure 1:
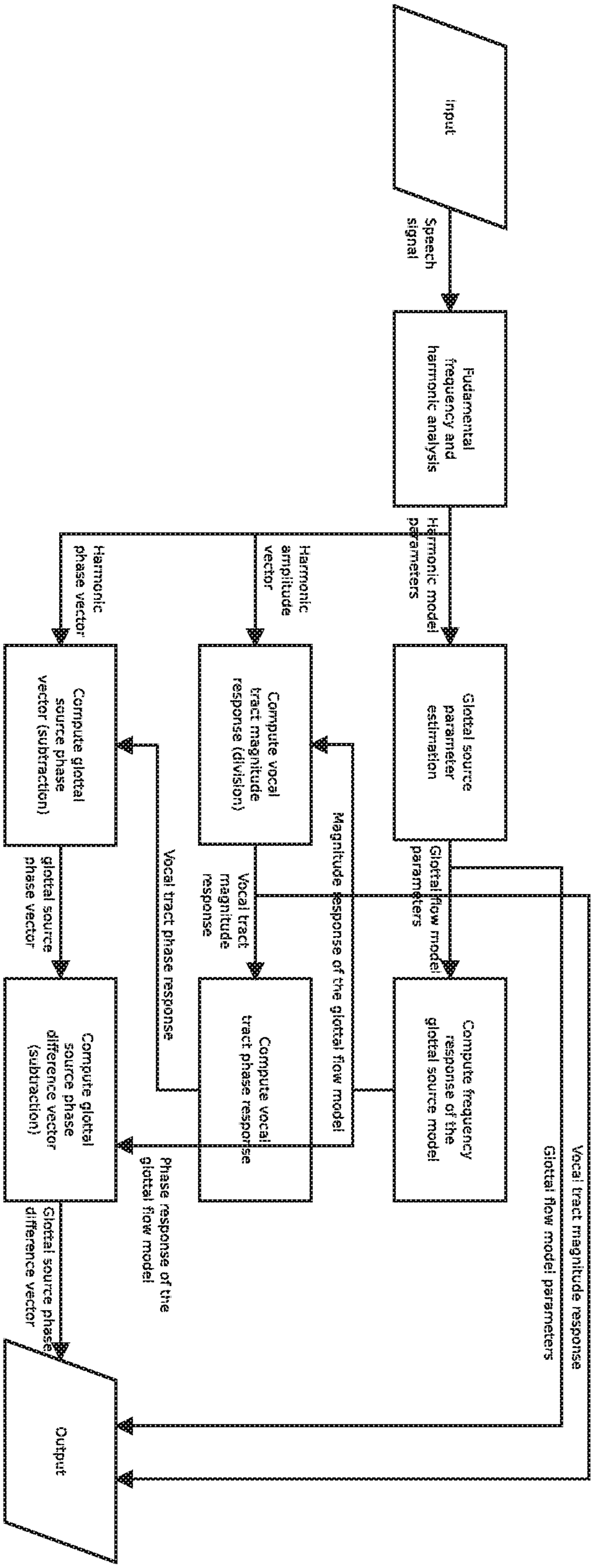
FIG. 1 shows the analysis stage of the basic form of the speech analysis/synthesis method of the present invention.

This patent discloses a speech analysis/synthesis method and a simplified form of such a method. In the analysis stage of the disclosed method, the parameters of a harmonic model are decomposed into vocal tract and glottal source components; in the synthesis stage, the parameters of a harmonic model are reconstructed from the vocal tract and glottal source components. The following is the detailed description of the analysis stage of the basic form of the speech analysis/synthesis method disclosed in the present invention, with reference to FIG. 1.

Step 1. Estimate fundamental frequency and harmonic model parameters from the input speech signal. The fundamental frequency $f_0$, amplitude vector $\alpha_k$ and phase vector $\theta_k$ of the harmonics at each analysis instant are obtained. Compute the relative phase shift (G. Degottex and D. Erro, "A uniform phase representation for the harmonic model in speech synthesis applications," EURASIP Journal on Audio, Speech, and Music Processing, vol. 2014, no. 1, 2014.) from the harmonic phase vector, $$\Phi_k=\theta_k-(k+1)\theta_0$$

The novelty of the present invention relates to a method for processing harmonic model parameters, and therefore the present invention is not limited by the approaches for fundamental frequency extraction and harmonic analysis. Well-accepted approaches to fundamental frequency estimation include YIN (A. D. Cheveign and H. Kawahara, "YIN, a fundamental frequency estimator for speech and music," The Journal of the Acoustical Society of America, vol. 111, no. 4, pp. 1917-1930, 2002.) and SRH (T. Drugman and A. Alwan, "Joint robust voicing detection and pitch estimation based on residual harmonics," in Interspeech, Florence, 2011.).

Well-accepted approaches to harmonic analysis include the peak-picking method (R. Mcaulay and T. Quatieri, "Speech analysis/Synthesis based on a sinusoidal representation," IEEE Transactions on Acoustics, Speech, and Signal Processing, vol. 34, no. 4, pp. 744754, 1986.) and the least-square-based method (J. Laroche, Y. Stylianou, and E. Moulines, "HNM: a simple, efficient harmonic noise model for speech," Proceedings of IEEE Workshop on Applications of Signal Processing to Audio and Acoustics, 1993.)

Step 2. Estimate the glottal source characteristics from the input speech at each analysis instant, obtaining the parameters of a glottal flow model. Compute the glottal source frequency response from the parameters of the glottal flow model, including the magnitude response and the phase response of the glottal flow model. The present invention is applicable on various glottal flow models, and therefore the present invention is not limited by the types of glottal flow models and the approaches to parameter estimation for such glottal flow models. This example implementation uses Liljencrants-Fant (LF) model (G. Fant, J. Liljencrants and Q. Lin, "A four-parameter model of glottal flow," STL-QPSR, vol. 26, no. 4, pp. 1-13, 1985.), and MSP method (G. Degottex, A. Roebel, and X. Rodet, "Phase Minimization for Glottal Model Estimation," IEEE Transactions on Audio, Speech, and Language Processing, vol. 19, no. 5, pp. 1080-1090, 2011.) for parameter estimation. The procedure for parameter estimation is listed as follows.

Step 2a. Generate a series of candidate LF model parameters. This procedure is illustrated by the example of Rd parameter: generate a sequence of candidate Rd parameters from 0.3 to 2.5 at a spacing of 0.1; the following operations are applied on each candidate Rd parameter.

Step 2b. According to the candidate Rd parameter, compute the $T_e$, $T_p$, $T_a$ parameters of a LF model; according to the fundamental frequency and $T_e$, $T_p$, $T_a$ parameters, compute $G^{Rd}(\omega_k)$, the frequency response of the LF model at the frequency of each harmonic. The specific method is described in G. Fant, J. Liljencrants and Q. Lin, "A four-parameter model of glottal flow," STL-QPSR, vol. 26, no. 4, pp. 1-13, 1985. and B. Doval, C. d'Alessandro, and N. Henrich. "The spectrum of glottal flow models," Acta acustica united with acustica, vol. 92, no. 6, pp. 1026-1046, 2006.

Step 2c. Multiply the frequency response of the LF model at each harmonic by a linear phase function; with reference to the $T_e$ parameter, align the LF impulse onto the instant of significant excitation, $$G_{LF}{}^{Rd}(\omega_k)=G_{LF}{}^{Rd}(\omega_k)e^{2\pi jTe(k+1)}$$

Step 2d. Remove the glottal source characteristics from the amplitudes and phases of the harmonics. Compute the vocal tract frequency response at the frequency of each harmonic, $$V(\omega_k)=\frac{\alpha_k e^{j\phi_k}}{G_{LF}^{Rd}(\omega_k)}$$

Step 2e. According to $|V(\omega_k)|$, the vocal tract magnitude response at each harmonic, compute $V_{min}(\omega_k)$, the minimum-phase frequency response of the vocal tract using homomorphic filtering.

Step 2f. Generate a series of candidate phase offsets. As an example, candidate phase offsets from $-\pi$ to $\pi$, at a spacing of 0.1 are generated.

Step 2g. For each candidate phase offset, compute the Euclidean distance between the phase components of $V(\omega_k)$ and $V_{min}(\omega_k)$, with reference to the phase offset, $$E=\frac{1}{K}\sum_{k=0}^{K-1}(\mathrm{wrap}(\Delta\theta(k+1)+\arg(V(\omega_k))-\arg(V_{min}(\omega_k))))^2$$

where wrap($\theta$) is the phase wrapping function; K is the number of harmonics; $\Delta\theta$ is the phase offset.

Step 2h. Choose the Rd parameter such that $\min_{\Delta\theta}E$ can be minimized, as the LF model parameter at the analysis instant being considered.

Step 2i. Optionally, in order to obtain a smooth Rd parameter trajectory, the time-varying Rd parameter sequence obtained in the above procedure can be processed by a median filter.

Once the parameters for the glottal flow model are determined, compute $G_{LF}(\omega_k)$, the glottal source frequency response at the frequency of each harmonic.

Step 3. Divide the harmonic amplitude vector by the model-derived glottal source magnitude response and the lip radiation magnitude response. The vocal tract magnitude response is obtained.

$$|V(\omega_k)|=\frac{a_k}{|G_{LF}(\omega_k)|\omega_k}$$

where the frequency response of the lip radiation is assumed to be $j\omega_k$, equivalent to a differentiator.

Since the lip radiation frequency response is independent from vocal tract and glottal source characteristics, such a frequency response can be merged into the glottal source frequency response. Therefore, when computing the glottal source frequency response in step 2, $G_{LF}(\omega_k)$ can be replaced by the frequency response of glottal flow derivative and in such a case the current step can be simplified as, $$|V(\omega_k)|=\frac{a_k}{|G_{LF}(\omega_k)|}$$

Alternatively, a spectral envelope $|S(\omega)|$ of the input speech can be first estimated from the harmonic amplitude vector and accordingly, the glottal source magnitude response $|G_{LF}(\omega_k)|$ defined on harmonics can be interpolated; then the spectral envelope of the former is divided by the spectral envelope of the latter. The vocal tract magnitude response obtained in such a way is a function defined over all frequencies, including not only the magnitude response on the harmonics, $$|V(\omega)| = \frac{|S(\omega)|}{|G_{LF}(\omega)|\omega}$$

Step 4. Compute the vocal tract phase response from the vocal tract magnitude response. Since the vocal tract frequency response can be approximately modeled by an all-pole filter, it can be assumed that the vocal tract frequency response is minimum-phase. Based on such an assumption, the vocal tract phase response $\arg(V(\omega_k))$ can be computed using homomorphic filtering.

Step 5. Compute the glottal source frequency response $G\omega_k$), including the magnitude and phase vectors of the glottal source corresponding to the harmonics, wherein $|G_{LF}(\omega_k)|$ obtained from step 2 is assigned to the magnitude vector of the glottal source; the phase vector of the glottal source is obtained using spectral division, that is, subtracting the vocal tract phase response from the harmonic phase vector (after removing the phase offset), $$\arg(G(\omega_k))=\Phi_k-\arg(V(\omega_k))$$

Step 6. Compute the difference between the phase vector of the glottal source harmonics obtained in step 5 and the model-derived glottal flow phase response obtained in step 2. The harmonic phase difference vector is obtained.

$$\Delta\Phi_k=\arg(G(\omega_k))-\arg(G_{LF}(\omega_k))$$

Figure 3:
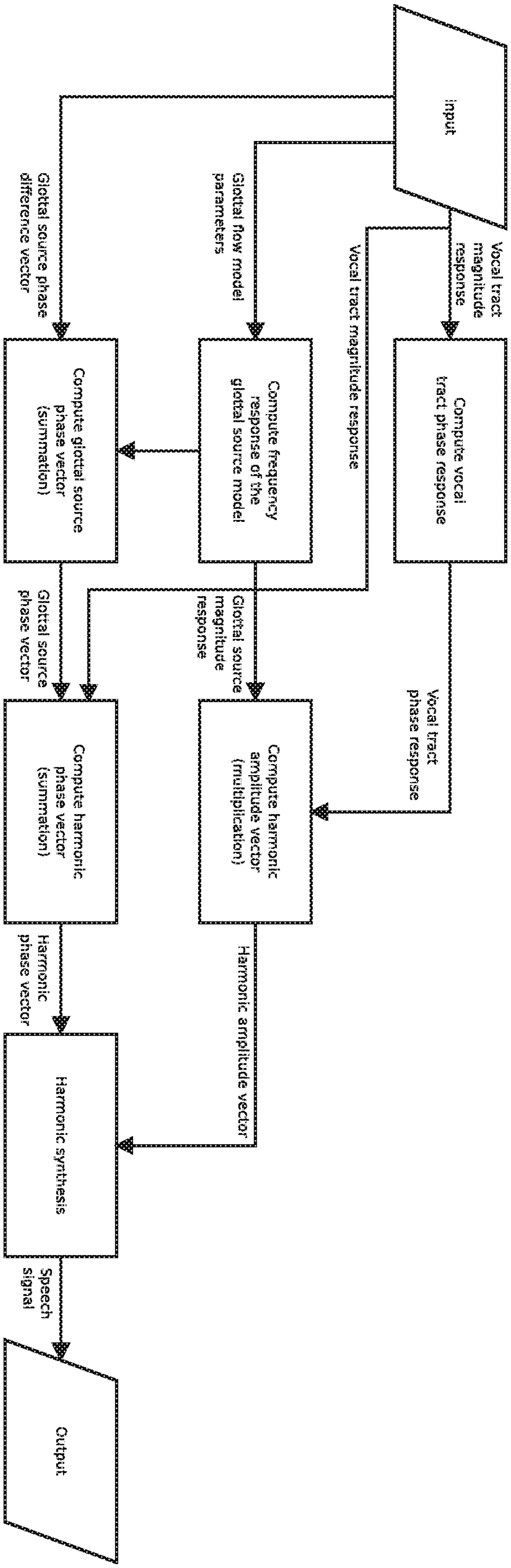
FIG. 3 shows the procedures of the synthesis stage according to the basic form of the speech analysis/synthesis method of the present invention.

According to the basic form of the speech analysis/synthesis method disclosed in the present invention, the synthesis stage comprises the following procedures, with reference to FIG. 3.

Step 1. Compute the vocal tract phase response $\arg(V(\omega_k))$ or $\arg(V(\omega))$ from the vocal tract magnitude response $|V(\omega_k)|$ or $|V(\omega)|$. The method for such computation is defined in step 4 of the analysis stage. When computing the phase response $\arg(V(\omega))$ from the magnitude response $|V(\omega)|$ defined on all frequencies, the phase response has to be sampled on the harmonic frequencies so that the result is $\arg(V(\omega_k))$.

Step 2. According to the glottal flow model parameters and the fundamental frequency, compute $G_{LF}(\omega_k)$, the frequency response of the glottal flow model, including the magnitude response and phase response of the glottal flow model. The method for such computation is defined in step 2b of the analysis stage.

Step 3. Compute the sum of the model-derived glottal flow phase response $\arg(G_{LF}(\omega_k))$ and the harmonic phase difference vector $\Delta\Phi_k$. The phase vector of the glottal source harmonics $\arg(G(\omega_k))$ is obtained.

$$\arg(G(\omega_k))=\arg(G_{LF}(\omega_k))+\Delta\Phi_k$$

Step 4. Multiply the amplitude vector of glottal source harmonics by the vocal tract magnitude response, obtaining the amplitude vector of speech harmonics. Compute the sum of the phase vector of glottal source harmonics and the vocal tract phase response, obtaining the phase vector of speech harmonics.

$$\alpha_k=|V(\omega_k)|\cdot|G_{LF}(\omega_k)|$$

$$\Phi_k=\arg(V(\omega_k))+\arg(G(\omega_k))$$

Step 5. Generate speech signal from the fundamental frequency and the amplitude and phase vectors of speech harmonics. The present invention is not limited by the methods for harmonic model synthesis. The implementation of such a harmonic synthesis procedure may refer to R. Mcaulay and T. Quatieri, "Speech analysis/Synthesis based on a sinusoidal representation," IEEE Transactions on Acoustics, Speech, and Signal Processing, vol. 34, no. 4, pp. 744754, 1986.

When modifying the fundamental frequency of speech using the analysis/synthesis method described above, the vocal tract magnitude response obtained from the analysis stage is resampled at an interval corresponding to the modified fundamental frequency; alternatively the spectral envelope is estimated using a spectral envelope estimation algorithm and is subsequently resampled at an interval corresponding to the modified fundamental frequency. Next, the vocal tract phase response at the frequency of each harmonic is computed under the minimum-phase assumption. The harmonic phase difference vector for the glottal source does not require modification.

Figure 2:
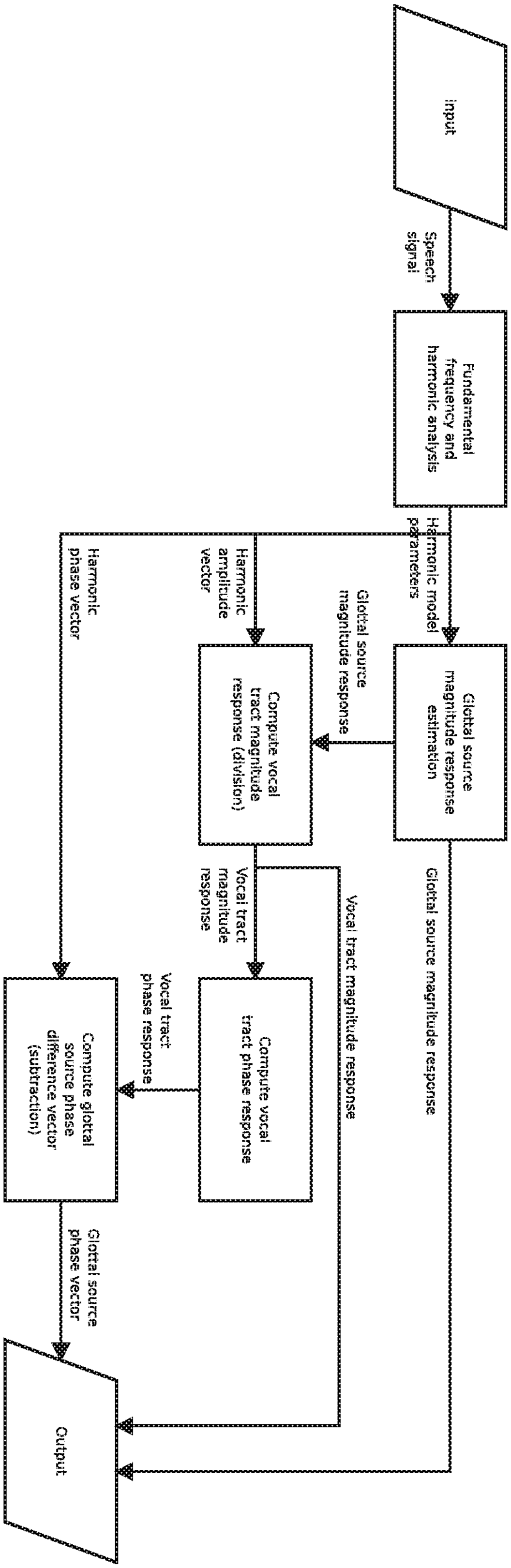
FIG. 2 shows the analysis stage of a simplified method in the present invention.

Based on the assumption that the shape of glottal flow signal remains approximately invariant with regards to changes in the fundamental frequency, a simplified form of the present speech analysis/synthesis method exists for the cases where the glottal sources parameters are not to be modified. Such a simplified method does not depend on any specific glottal source model and thus the glottal source parameter estimation step becomes optional. The following is the detailed description of the analysis stage of such a simplified method, with reference to FIG. 2.

Step 1. Estimate fundamental frequency and harmonic model parameters from the input speech signal. The fundamental frequency $f_0$, amplitude vector $\alpha_k$ and phase vector $\theta_k$ of the harmonics at each analysis instant are obtained. Compute the relative phase shift from the harmonic phase vector, $$\Phi_k=\theta_k-(k+1)\theta_0$$

Step 2. Optionally, estimate the glottal source characteristics of the input signal at each analysis instant and compute the glottal source magnitude response $|G(\omega)|$.

The method for estimating glottal source characteristics need not be based on a certain glottal flow model; such an estimation method can be any technique that estimates the glottal source magnitude response. This present invention is not limited by the methods for estimating glottal source magnitude response.

For instance, the said estimation method can be linear prediction based on an all-pole filter model. The input speech is windowed at each analysis instant and the coefficients of a 2nd-order all-pole filter are estimated using linear prediction. The magnitude response is computed from the coefficients of the all-pole filter.

The magnitude response obtained from the method described above is approximately the product of the glottal source magnitude response and the lip radiation magnitude response. Since the lip radiation frequency response is independent from glottal source and vocal tract characteristics, its magnitude component can be merged into the glottal source magnitude response.

Step 3. Compute the vocal tract magnitude response $|V(\omega_k)|$ or $|V(\omega)|$.

In the case where the glottal source magnitude response is unknown, assume the glottal source magnitude response is constant (i.e. $|G(\omega)|=1$) and define the vocal tract magnitude response to be the same as the harmonic amplitude vector; in the case where the glottal source magnitude response is known, divide the harmonic amplitude vector by the glottal source magnitude response to obtain the vocal tract magnitude response, $$|V(\omega_k)| = \frac{a_k}{|G(\omega_k)|}$$

Alternatively, a spectral envelope $|S(\omega)|$ of the input speech can be first estimated from the harmonic amplitude vector; then the spectral envelope is divided by the glottal source magnitude response. The vocal tract magnitude response obtained in such a way is a function defined over all frequencies, including not only the magnitude response on the harmonics, $$|V(\omega)| = \frac{|S(\omega)|}{|G(\omega)|}$$

Step 4. Compute the vocal tract phase response $\arg(V(\omega))$ from the vocal tract magnitude response. The method for the said computation is defined in step 4 of the analysis stage of the present method (basic form).

Step 5. Compute the glottal source frequency response, including the magnitude and phase vectors of the glottal source corresponding to the harmonics. The amplitude vector of the glottal source has been obtained in step 2; the phase vector of the glottal source is obtained by subtracting the vocal tract phase response from the harmonic phase vector, $$\arg(G(\omega_k))=\Phi_k-\arg(V(\omega_k))$$

Figure 4:
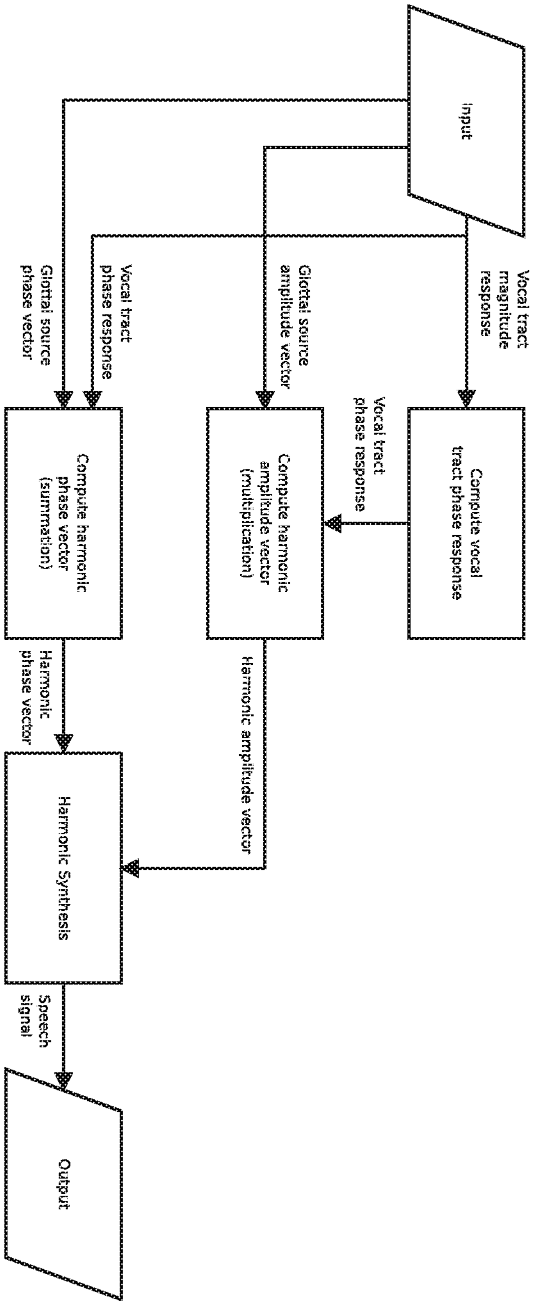
FIG. 4 shows the procedures of the synthesis stage according to the simplified form of the speech analysis/synthesis method of the present invention.

According to the simplified form of the speech analysis/synthesis method disclosed in the present invention, with reference to FIG. 4, the synthesis stage comprises the following procedures.

Step 1. Compute the vocal tract phase response $\arg(V(\omega_k))$ or $\arg(V(\omega))$ from the vocal tract magnitude response $|V(\omega_k)|$ or $|V(\omega)|$. The method for the said computation is defined in step 4 of the analysis stage of the present method (basic form). When computing the phase response $\arg(V(\omega))$ from the magnitude response $|V(\omega)|$ defined on all frequencies, the phase response has to be sampled on the harmonic frequencies so that the result is $\arg(V(\omega_k))$.

Step 2. Multiply the amplitude vector of glottal source harmonics by the vocal tract magnitude response, obtaining the amplitude vector of speech harmonics. Compute the sum of the vocal tract phase response and the phase vector of glottal source harmonics, obtaining the phase of each harmonic, $$\alpha_k=|V(\omega_k)|\cdot|G(\omega_k)|$$

$$\Phi_k=\arg(V(\omega_k))+\arg(G(\omega_k))$$

Step 3. Generate speech signal from the fundamental frequency and the amplitude and phase of each harmonic. The present invention is not limited by the methods for harmonic model synthesis.

The basic form of the speech analysis/synthesis method disclosed in the present invention is applicable to applications involving modification of the glottal source parameters; the simplified form is applicable to applications that do not involve modification of the glottal source parameters.

By preserving the phase of the glottal flow model and utilizing the glottal source harmonic phase difference obtained from frequency-domain inverse filtering, the basic form of the speech analysis/synthesis method disclosed in the present invention more effectively preserves the phases in the input speech. In addition, the present invention significantly reduces the impact of glottal flow parameter estimation accuracy on the quality of synthesized speech. Based on the shape invariant assumption of the glottal flow waveform, a simplified form of the present method maps the glottal source characteristics onto the harmonics, instead of relying on any explicit glottal flow model or any parameter estimation procedure for such a glottal flow model. The simplification avoids the problems induced by the poor accuracy of glottal flow model parameter estimation, in addition to simplifying the analysis/synthesis procedures and thus improving the efficiency.

The speech analysis/synthesis method disclosed in the present invention is applicable to models including sinusoidal model, harmonic plus noise model and harmonic plus stochastic model. The process of tailoring the present method to the aforementioned models belongs to the techniques well known to those of ordinary skill in the art, and thus is not described in detail.

What is claimed is:

1. A speech analysis method based on a harmonic model, the speech analysis method comprising:

a) decomposing parameters of the harmonic model into a glottal source component and a vocal tract component, the glottal source component comprising parameters of a glottal flow model and phase difference corresponding to each harmonic, performing harmonic analysis on an input speech signal and obtaining a fundamental frequency, a harmonic amplitude vector and a harmonic phase vector at each analysis instant;

b) estimating glottal source features from the input speech signal at each analysis instant, obtaining the parameters of the glottal flow model, and computing a glottal source frequency response from the parameters of the glottal flow model, the glottal source frequency response including a magnitude response and a model-derived phase response of the glottal flow model;

c) dividing the harmonic amplitude vector by the magnitude response of the glottal flow model, obtaining a vocal tract magnitude response;

d) computing a vocal tract phase response from the vocal tract magnitude response by using homomorphic filtering based on a minimum-phase assumption;

e) computing the glottal source frequency response comprising a phase vector of the glottal source component, obtaining the phase vector of the glottal source component by subtracting the vocal tract phase response from the harmonic phase vector; and f) computing the difference between the phase vector of the glottal source component obtained in step e and the model-derived phase response of the glottal flow model obtained in step b, obtaining a harmonic phase difference vector.

2. A speech analysis method based on a harmonic model, the speech analysis method comprising:

a) decomposing parameters of the harmonic model into a glottal source component and a vocal tract component, the glottal source component comprising an amplitude vector and a phase vector, performing harmonic analysis on an input speech signal, obtaining fundamental frequency, a harmonic amplitude vector and a harmonic phase vector at each analysis instant;

b) obtaining a vocal tract magnitude response comprising: when a glottal source magnitude response is unknown, defining a vocal tract magnitude response to be the same as the harmonic amplitude vector; when the glottal source magnitude response is known, dividing the harmonic amplitude vector by the glottal source magnitude response to obtain the vocal tract magnitude response;

c) computing a vocal tract phase response from the vocal tract magnitude response using homomorphic filtering based on a minimum-phase assumption; and d) computing a glottal source frequency response comprising a phase vector of the glottal source component, obtaining the phase vector of the glottal source component by subtracting the vocal tract phase response from the harmonic phase vector.

3. A speech synthesis method based on a harmonic model, the speech synthesis method comprising:

a) computing a vocal tract phase response from a given vocal tract magnitude response using homomorphic filtering based on a minimum-phase assumption;

b) from parameters of a glottal flow model, computing a frequency response of the glottal flow model comprising a magnitude response and a model-derived phase response of the glottal flow model;

c) computing a sum of the model-derived phase response of the glottal flow model and a harmonic phase difference vector, obtaining a phase vector of glottal source harmonics;

d) computing a product of the vocal tract phase response and the vocal tract magnitude response at the frequency of each harmonic, obtaining an amplitude vector of speech harmonics, computing a sum of the phase vector of glottal source harmonics and the vocal tract phase response, obtaining a phase vector of speech harmonics; and e) generating a speech signal from a fundamental frequency, the amplitude vector and the phase vector of the speech harmonics.

4. A speech synthesis method based on a harmonic model, the speech synthesis method comprising:

a) computing a vocal tract phase response from a given vocal tract magnitude response using homomorphic filtering based on a minimum-phase assumption;

b) computing a product of the vocal tract magnitude response and an amplitude vector of the glottal source features at a frequency of each harmonic, obtaining an amplitude vector of speech harmonics, computing a sum of the phase vector of glottal source features and the vocal tract phase response, obtaining a phase vector of the speech harmonics; and c) generating a speech signal from a fundamental frequency, the amplitude vector, and the phase vector of the speech harmonics.

5. The speech analysis method of claim 1, wherein the glottal flow model is selected from the group consisting of Liljencrants-Fant model, KLGLOTT88 model, Rosenberg model, and R++ model.

6. The speech analysis method of claim 1, wherein estimating the glottal source features is by a method selected from the group consisting of MSP (Mean Squared Phase), IAIF (Iterative Adaptive Inverse Filtering), and ZZT (Zeros of Z Transform).

7. The speech analysis method of claim 1, wherein the harmonic model is selected from the group consisting of sinusoidal model, harmonic plus noise model, harmonic plus stochastic model, and models including sinsuoidal or harmonic components.

8. The speech analysis method of claim 2, wherein the harmonic model is selected from the group consisting of sinusoidal model, harmonic plus noise model, harmonic plus stochastic model, and models including sinsuoidal or harmonic components.

9. The speech analysis method of claim 2 comprising estimating glottal source features of an input signal at each analysis instant and computing the glottal source magnitude response.

10. The speech synthesis method of claim 3, wherein the harmonic model is selected from the group consisting of sinusoidal model, harmonic plus noise model, harmonic plus stochastic model, and models including sinsuoidal or harmonic components.

11. The speech synthesis method of claim 3, wherein the glottal flow model is selected from the group consisting of Liljencrants-Fant model, KLGLOTT88 model, Rosenberg model, and R++ model.

12. The speech synthesis method of claim 4, wherein the harmonic model is selected from the group consisting of sinusoidal model, harmonic plus noise model, harmonic plus stochastic model, and models including sinsuoidal or harmonic components.

* * * * *